United States Patent [19]

Haynes

[11] Patent Number: 4,723,571

[45] Date of Patent: Feb. 9, 1988

[54] FLUID SUPPLY APPARATUS

[76] Inventor: Henry T. Haynes, 10050 S. 33rd West Ave., Tulsa, Okla. 74132

[21] Appl. No.: 26,745

[22] Filed: Mar. 17, 1987

[51] Int. Cl.⁴ ............................................. G05D 16/08
[52] U.S. Cl. .................................. 137/493.7; 137/510; 137/565; 137/606; 137/907
[58] Field of Search ...................... 137/493.7, 509, 510, 137/565, 606, 907

[56] References Cited

U.S. PATENT DOCUMENTS

| | | |
|---|---|---|
| 1,461,662 | 1/1920 | Kawamura . |
| 1,583,834 | 5/1926 | Humphrey ........................ 137/493.7 |
| 1,587,176 | 6/1926 | Olsen . |
| 2,883,998 | 4/1959 | Broughton ........................ 137/116.3 |
| 3,028,879 | 4/1962 | Anderson ............................ 137/556 |
| 3,766,933 | 10/1973 | Nicholson, Jr. ................... 137/116.3 |
| 4,350,136 | 9/1982 | Yanagisawa ........................ 123/568 |
| 4,408,961 | 10/1983 | Laybourne ........................... 417/189 |

Primary Examiner—Robert G. Nilson
Attorney, Agent, or Firm—Larry R. Watson

[57] ABSTRACT

A fluid supply apparatus includes a pressure reducing valve. The inlet passageway of the valve is connectable to a first fluid supply and the outlet passageway of the valve is connectable to a fluid user capable of generating a subatmospheric pressure. The actuator of the valve biases the valve to a closed position. A pressure sensing line communicates the pressure from the outlet passageway of the valve to the actuator in opposition to bias of the actuator. The presence of a subatmospheric pressure at the outlet passageway of the valve will move the actuator and valve towards the open position allowing fluid to flow from the first fluid supply to the fluid user with the valve reducing the non-subatmospheric pressure of the fluid in the first fluid supply to the sub-atmospheric pressure of the outlet passageway. A flow dividing vane is provided in the valve between the orifice of the valve and the outlet passageway in order to minimize pressure fluctuations in the outlet passageway. A second fluid supply may be connected to the outlet passageway and a presence of a subatmospheric pressure in the outlet passageway will draw fluid from the second fluid supply into the outlet passageway. A relief passageway is provided between the inlet passageway and outlet passageway and includes a unidirectional valve which will allow fluid to flow only from the outlet passageway to the inlet passageway.

19 Claims, 7 Drawing Figures

FLUID SUPPLY APPARATUS

BACKGROUND OF THE INVENTION

This invention relates to fluid supply apparatus and more particularly to such an apparatus which will take fluid from multiple fluid supplies in which the fluid exists at above atmospheric pressure, commingle the fluids in selected proportion, and supply the commingled fluids to a fluid user at a subatmospheric pressure.

Vacuum operated valves which use a vacuum control signal to a diaphragm to operate the valve have been known for some time, such as disclosed in U.S. Pat. No. 1,461,662 issued to Kawamura, U.S. Pat. No. 1,587,176 issued to Olsen, and U.S. Pat. No. 4,350,136 issued to Yanagisawa. Vacuum control valves which control the supply of a vacuum from a vacuum source to a vacuum user have also been known for some time, such as disclosed in U.S. Pat. No. 2,883,998 issued to Broughton. The known vacuum operated and vacuum control valves have shortcomings in that they will not take fluid from a fluid supply existing at a pressure of up to 100 pounds per square inch above atmospheric pressure and greater and reduce the fluid pressure to subatmospheric pressure; and the vacuum control signal can not be taken from the outlet passageway of the valve because the pressure is unstable in the outlet passageway. Since the pressure is unstable in the outlet passageway, a sufficient length of piping must be connected between the outlet passageway and the fluid user to allow the fluid pressure to stabilize if the vacuum control signal is to be taken from the connection between the valve and the fluid user.

Chemical injection systems, such as used in coin operated car washes, are also known in the art. A typical chemical injection system used by coin operated car washes receives its main fluid or water supply from a public water supply. The water supply must be protected from contamination by the chemicals used in the car wash. This is normally accomplished by installing a tank having a level operated float inside the tank and a level transmitter connected to the float. The level transmitter provides a signal to a control valve which is in the water supply. The float and level transmitter operate the control valve to maintain a level of water in the tank. The water dumps into the tank at a point above the normal level of water in the tank to prevent any back flow of water from the tank into the water supply. The tank is connected to a pump which supplies the high pressure water to the car wash. In order to inject chemicals, such as soap and wax, into the car wash a flow restriction orifice is placed in the line between the pump and the float tank in order to create a vacuum between the pump and the flow restriction orifice. A chemical supply is connected between the pump and the orifice and the vacuum created between the pump and the orifice draws chemicals from the chemical supply into the pump and car wash. A shortcoming of this type of chemical injection system is its relative complexity, maintenance cost, and installation cost.

SUMMARY OF THE INVENTION

Accordingly, it is an object and advantage of this invention to provide a fluid supply apparatus capable of taking fluid from a fluid supply existing at a pressure of up to 100 pounds per square inch above atmospheric pressure and greater and reduce the fluid to subatmospheric pressure, taking the pressure drop across one pressure reducing valve.

It is further object and advantage of the present invention to provide a fluid supply apparatus capable of taking fluid from multiple fluid supplies existing at above atmospheric pressure, commingling the fluids, and supplying the commingled fluids to a fluid supply user at a subatmospheric pressure.

It is a further object and advantage of the present invention to provide a fluid mixing or chemical injection system which requires only a pump or fluid user, a pressure reducing valve, and supplies of the fluids or chemicals to be mixed.

It is a further object and advantage of the present invention to eliminate the chattering and instability present in a pressure reducing valve which reduces fluid from above atmoshperic pressure to a subatmospheric pressure and to stabilize the fluid pressure in the outlet passageway of the valve so that the control signal which controls the actuator of the valve may be taken from the outlet passageway.

It is a further object and advantage of the present invention to eliminate the need for long lengths of piping between the valve and the fluid user to stabilize the turbulence and pressure fluctuations in the fluid flow so that the valve may be located in close proximity to the fluid user.

It is a further object and advantage of the present invention to provide a pressure reducing valve capable of taking existing at pressures of up to 100 pounds per square inch above atmospheric pressure and greater and reducing the fluid pressure to a subatmospheric pressure.

It is a further object and advantage of the present invention to provide a pressure reducing valve which has the capability of taking fluids from multiple fluid supplies existing at above atmospheric pressures and reducing the pressure of the fluids to subatmospheric pressure while commingling the fluids.

It is a further object and advantage of the present invention to provide a pressure reducing valve which may be easily disassembled into two pieces, i.e., an actuator means and a valve body, or three pieces i.e., a valve body, an actuator means, and a valve cage, in order to facilitate production and maintenance of the valve.

It is a further object and advantage of the present invention to provide a pressure reducing valve in which the pressure sensing line which provides the control signal to the actuator of the valve may be connected from the actuator to the outlet connection through a pressure passageway in the valve body, thus eliminating the need for connections external to the valve.

It is a further object and advantage of the present invention to provide a pressure reducing valve which provides an injection passageway through the valve body to the outlet passageway of the valve so that fluids may be injected into the main fluid flow through the valve body.

It is a further object and advantage of the present invention to provide a pressure reducing valve which will relieve an excessive pressure existing at the outlet connection of the valve through the valve body to the inlet side of the valve.

It is a futher object and advantage of the present invention to provide a fluid supply apparatus which may be used as a chemical injection system such as used in coin operated car washes and eliminate the need for a tank having a level transmitter and float, a water control valve operated by the level transmitter float, and a flow restriction orifice, thus greatly simplifying the chemical injection system and reducing installation and maintenance costs.

The fluid supply apparatus of the present invention includes a pressure reducing valve. The valve includes a valve body and an actuator means. The valve body includes a bore extending into the valve body, an inlet passageway extending into the valve body and being in fluid communication with the bore, an outlet passageway extending into the valve body and being in fluid communication with the bore, an orifice located in the bore between the inlet passageway and the outlet passageway, and a flow dividing vane extending across and partially blocking the bore between the orifice and the outlet passageway. The inlet passageway is connectable to a first fluid supply. The outlet passageway is connectable to the intake connection of a suction-demand-type fluid user capable of generating a subatmospheric pressure at its inlet connection. The orifice is smaller in diameter than the bore and allows fluid communication between the inlet passageway and the outlet passageway. The flow dividing vane blocks direct flow of fluid from the bore into the outlet passageway and divides the flow of fluid from the bore into the outlet passageway in order to minimize fluid flow turbulence and pressure fluctuations in the outlet passageway. A plug is positionable in the bore. The plug is movable relative to the orifice between a closed position in which fluid communication through the orifice is minimized and an open position in which fluid communication through the orifice is maximized. A valve stem has a first end connected to the plug and a second end. An actuator means is sealingly connectable to the valve body, the bore, and the second end of the valve stem and moves the plug between the open position and the closed position. Biasing means are provided for biasing the plug into the closed position. The actuator means is fluid pressure communicatingly connectable to the connection between the outlet passageway and the fluid user and moves the plug towards the open position when a subatmospheric pressure is communicated to the actuator means in opposition to the bias of the biasing means.

A second fluid supply may be fluid communicatingly connected to the connection between the fluid user and the valve body outlet passageway so that the creation of a subatmospheric pressure at the intake connection of the fluid user will pull a flow of the second fluid into the intake connection. Metering means may be connected between the second fluid supply and the fluid user to selectively control the flow of second fluid from the second fluid supply through the metering means into the fluid user intake connection.

The valve body may include an injection passageway extending into the valve body and being in fluid communication with the outlet passageway. The second fluid supply may be connected to the injection passageway.

A pressure passageway is provided which extends into the valve body and is in fluid communication with the outlet passageway. The actuator means may be connected to the pressure passageway to communicate pressure from the outlet connection to the actuator means.

A relief passageway is provided which communicates between the inlet passageway and the outlet passageway. The relief passageway includes a unidirectional valve which allows fluid to flow from the outlet passageway through the relief passageway to the inlet passageway and prevents fluid flow from the inlet passageway through the relief passageway to the outlet passageway. The relief passageway allows excessive pressure on the outlet passageway side of the valve to relieve against the inlet passageway and first fluid supply.

The pressure reducing valve may also include a generally cylindrical, hollow valve cage which is sealingly positionable in the bore. The cage has an open first end a closed second end and includes an inlet chamber which is fluidly communicable with the inlet passageway and an outlet chamber which is fluidly communicable with the outlet passageway when the cage is installed in the valve body. When the cage is used with the valve body the orifice is included as an integral part of the cage. The orifice is located in the cage between the inlet chamber and the outlet chamber and is of smaller aperture than the cage. The flow dividing vane is also included as an integral part of the cage and extends across one side of the outlet chamber to block direct flow from the outlet chamber into the outlet passageway. The plug is positionable in the cage with the second end of the valve stem being extendable through the open end of the cage. The actuator means is sealingly connectable to the valve body, the bore, the open end of the cage, and the second end of the valve stem. In one embodiment the second end of the cage is larger than the bore of the valve body, and the actuator means connects to the first end of the cage. The cage fastens the actuator means, valve body, and cage into an assembled, operational pressure reducing valve.

BRIEF DESCRIPTION OF THE DRAWINGS

The present invention will be better understood by reference to the examples of the following drawings.

DETAILED DESCRIPTION OF THE PREFERRED EMBODIMENTS

Before explaining the present invention in detail, it is to be understood that the invention is not limited to the details of construction and arrangement of parts illustrated in the accompanying drawings, since the invention is capable of other embodiments and of being practiced and carried out in various ways commensurate with the claims herein. Also, it is to be understood that the terminology employed herein is for the purpose of description and not of limitation.

Figure 1:
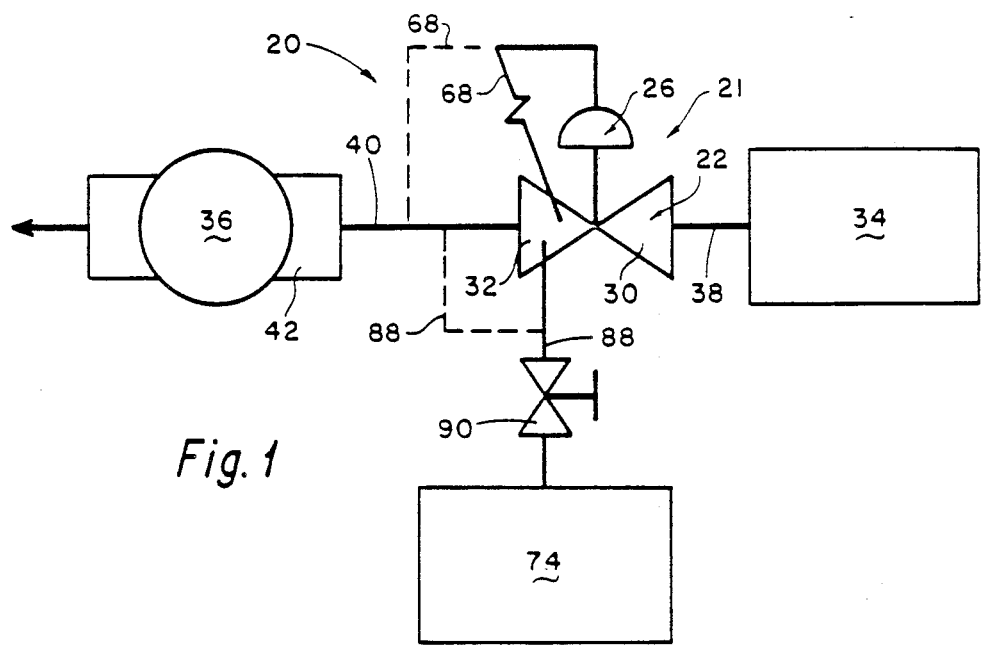
FIG. 1 is a schematic representation of a preferred embodiment of the fluid supply apparatus of the present invention.
Figure 2:
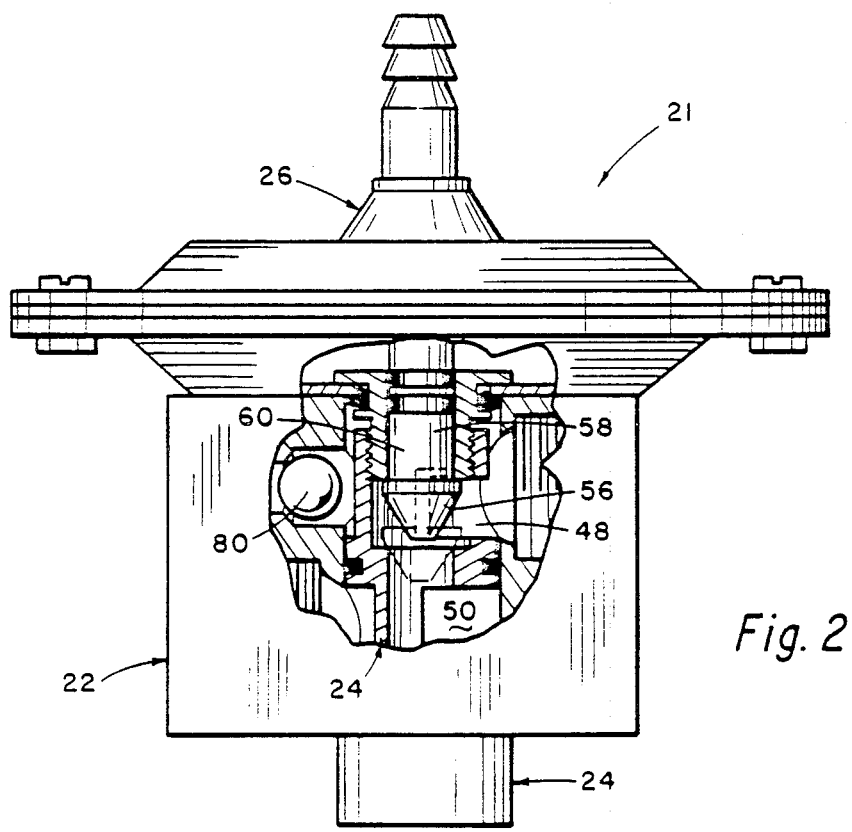
FIG. 2 is a side view of a preferred embodiment of a pressure reducing valve of the present invention. A portion of the pressure reducing valve is cut away to expose some detail of the internal assembly of the pressure reducing valve.
Figure 3:
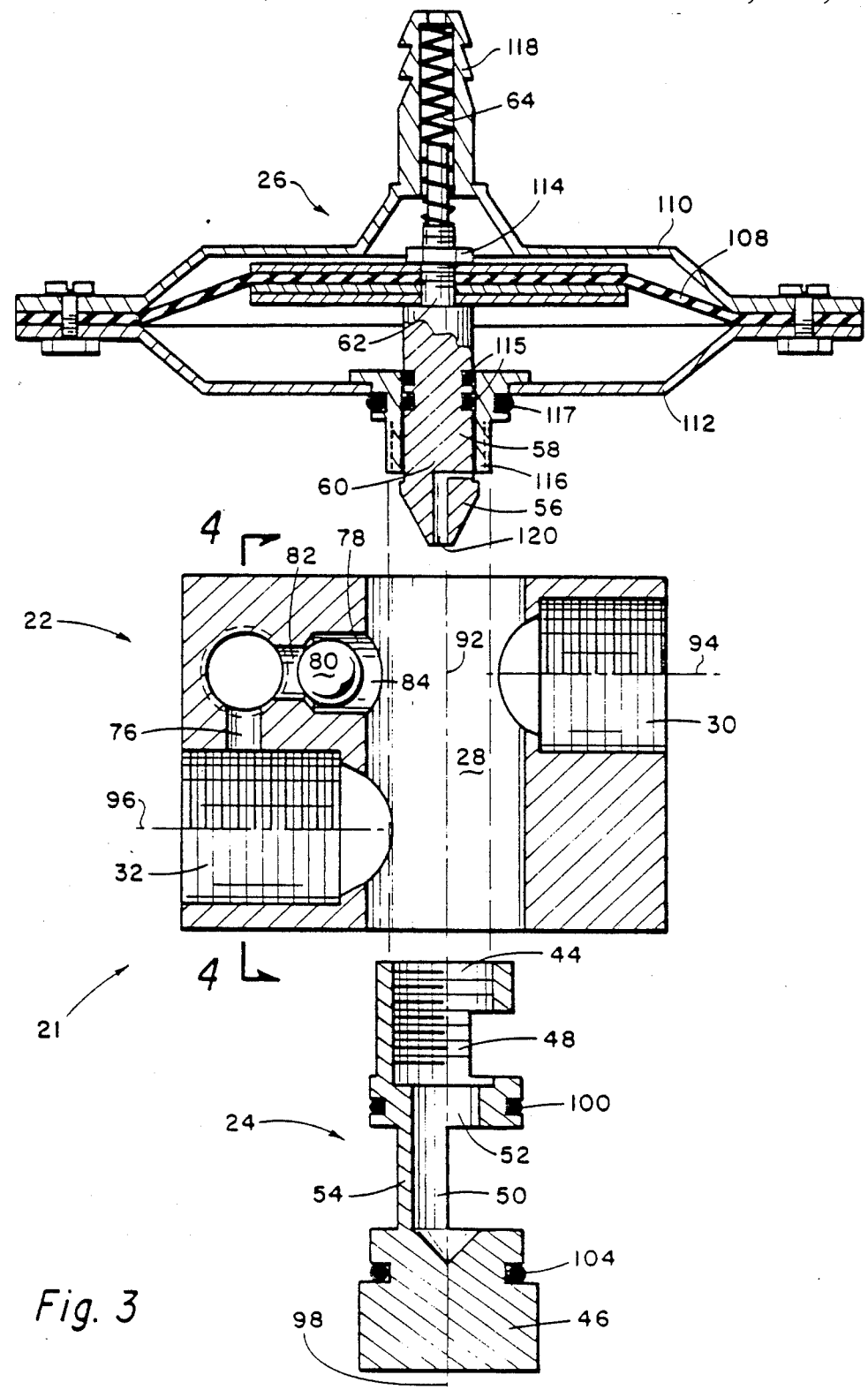
FIG. 3 is an exploded cross-sectional view of the pressure reducing valve of FIG. 2.

FIGS. 1-7 present a preferred embodiment of the fluid supply apparatus, generally designated 20, of the present invention. Referring to the example of FIG. 3, the invention may be generally described as being comprises of a pressure reducing valve, generally designated 21. The pressure reducing valve 21 may be described as being generally comprised of a valve body 22, a valve cage 24, and an actuator means 26. In the preferred embodiment, as illustrated in FIG. 3, the pressure reducing valve 21 may be easily disassembled into these three components, facilitating maintenance of the valve 21.

The valve body 22 includes a bore 28 extending into the valve body 22, an inlet passageway 30 extending into the valve body 22 and being in fluid communication with the bore 28, and an outlet passageway 32 extending into the valve body 22 and being in fluid communication with the bore 28. Referring to FIG. 1 the inlet passageway 30 is connected to a first fluid supply 34 and the outlet passageway 32 is connected to a fluid user 36 when the apparatus 20 is in use. The connection 38 between the inlet passageway 30 and the first fluid supply 34 carries fluid from the first fluid supply 34 to the valve and should be leak-free under all fluid pressures expected in the first fluid supply. The connection 40 between the fluid user 36 and the outlet passageway 32 carries fluid from the valve 21 to the fluid user 36 and should be a leak free connection capable of withstanding the fluid pressures present in any fluid supplies to be connected to the valve 21 and should also be capable of withstanding and maintaining a subatmospheric pressure in the connection 40. Typically the connections 38, 40 will be piping, tubing, or similar conduit.

The fluid user 36 should be a suction-demand-type fluid user, that is, it should be capable of generating a subatmospheric pressure at its intake connection 42. In the preferred embodiment the fluid user 36 is a pump although the fluid supply apparatus 20 will operate with other fluid users, such as compressors, and vacuum or suction sources.

Figure 7:
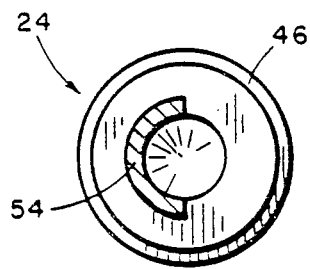
FIG. 7 is a sectional view along line 7—7 of FIG. 5.
Figure 5:
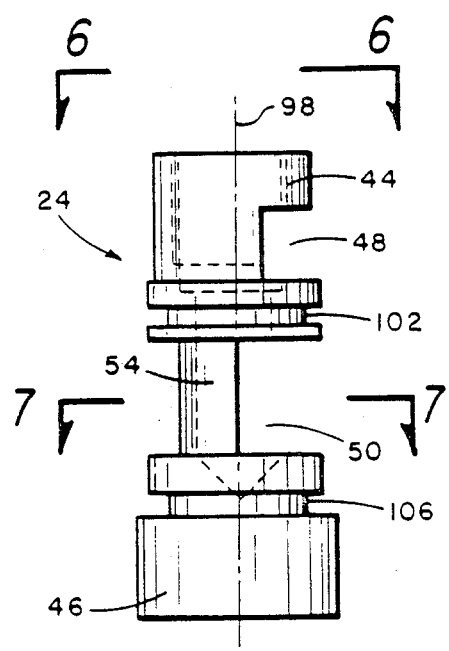
FIG. 5 is a side view of a preferred embodiment of the valve cage of the present invention.

Referring to FIGS. 3, 5, 6, and 7, the valve cage 24 is of generally cylindrical and hollow configuration having an open first end 44 and a closed second end 46. The cage 24 includes an inlet chamber 48, an outlet chamber 50, an orifice 52 (best seen in FIGS. 3 and 6), and a flow dividing vane 54. The cage 24 should be sealingly positionable in the bore 28. When the cage 24 is positioned in the bore 28 the inlet chamber 48 should be fluidly communicable with the inlet passageway 30 and the outlet chamber 50 should be fluidly communicable with the outlet passageway 32, that is, fluid should flow from the inlet passageway 30 into the inlet chamber 48 and from the outlet chamber 50 into the outlet passageway 32. The orifice 52 is located in the cage 24 between the inlet chamber 48 and the outlet chamber 50. The orifice should be of smaller aperture or diameter than the internal diameter of the cage. The orifice 52 allows fluid communication or fluid flow between the inlet chamber 48 and the outlet chamber 50. Referring to FIGS. 5 and 7, the flow dividing vane 54 extends across one side of the outlet chamber 50 and blocks direct fluid flow between the outlet chamber 50 and the outlet passageway 32. The vane 54 divides the flow of fluid from the outlet chamber 50 to the outlet passageway 32 into two streams thereby minimizing fluid flow turbulence and pressure fluctuations in the outlet passageway 32. The cage 24 may be made of several fitted pieces, although in the preferred embodiment the cage 24, inlet chamber 48, outlet chamber 50, orifice 52, and flow dividing vane 54 are a unitary, integral unit, best seen in FIGS. 3 and 5.

The cage 24 may be eliminated, i.e., the orifice 52 may be located in the bore 28 between the inlet passageway 30 and the outlet passageway 32, the flow dividing vane 54 may be extended across and partially block the bore 28 between the orifice 52 and the outlet passageway 32, and the opposite end of the bore 28 from the actuator means 26 may be closed or sealed. The orifice 52 and flow dividing vane 54 can thus be made an integral part of the valve body 22, eliminating the need for valve cage 24. The valve cage 24 is used in the preferred embodiment at the present time in order to simplify manufacture and assembly of the valve 21 and to minimize the cost of the valve 21.

Referring to FIGS. 1 and 7, the pressure reducing valve 21 also includes a plug 56, positionable in the cage 24. Referring to FIG. 2, the plug 56 cooperates with the orifice 52 and is movable relative to the orifice 52 between a closed position, illustrated in phantom in FIG. 7, in which fluid communication or flow through the orifice 52 is minimized and an open position in which fluid communication or flow through the orifice 52 is maximized. In the closed position the plug 56 sealingly contacts the orifice 52 and in the open position the plug 56 is moved away from the orifice 52 allowing fluid flow around the plug into the orifice. The valve 21 also includes a valve stem 58 having a first end 60 connected to the plug and a second end 62 extendable out of the bore 28 and the first end 44 of the cage 24.

Biasing means 64 are provided for biasing the plug 56 into the closed position, as further discussed below.

The actuator means 26 is sealingly connectable to the valve body 22, the bore 28, the open end 44 of the cage 24, and the second end 62 of the valve stem 58, as best seen in FIG. 2. The actuator means 26 moves the plug 56 between the open position and the closed position. The actuator means 26 should move the plug 56 towards the open position when a subatmospheric pressure is communicated to the actuator means 26 in opposition to the bias of the biasing means 64. Referring to FIG. 1, when the apparatus 20 is in use the actuator means 26 is connected to the connection 40 between the outlet passageway 32 and the fluid user 36. The connection 68 is essentially a pressure sensing line, also designated 68, which applies the fluid pressure present in the connection 40, which is the same fluid pressure present at the intake connection 42 of the fluid user 36, to the actuator means 26. The pressure sensing line 68 should be connected in such a manner as to apply the fluid pressure in opposition to the bias of the biasing means 64.

Figure 4:
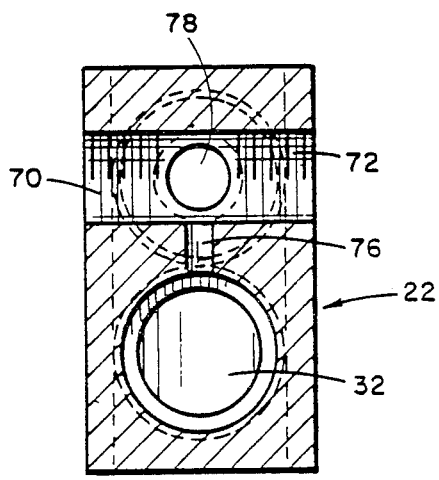
FIG. 4 is a sectional view along line 4—4 of FIG. 3.
Figure 6:
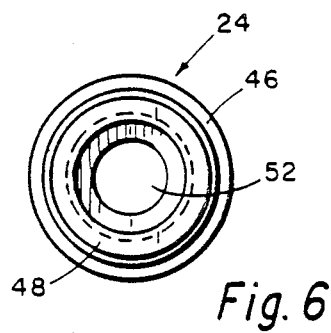
FIG. 6 is a sectional view along line 6—6 of FIG. 5.

Referring to FIG. 4, in the preferred embodiment the valve body 22 includes a pressure passageway 70 which extends into the valve body 22 and is in fluid communication with the outlet passageway 32. The actuator means 26 is fluid pressure communicatingly connectable to the pressure passageway 70, as seen schematically in FIG. 1. The pressure passageway 70 allows the pressure sensing line 86 to be directly connected from the valve body 22 to the actuator means 26, eliminating the need for connections external to the valve body 22 and simplifying the installation of the valve 21.

Similarly, in the preferred embodiment, referring to FIG. 4, the valve body 22 includes injection passageway 72 which extends into the valve body and is in fluid communication with the outlet passageway 32. The injection passageway 72 allows a second fluid supply 74, best seen in FIG. 1, to be directly connected to the valve body 22, eliminating the need for second fluid supply connections external to the valve body 22 and simplifying the installation of the valve 21. The injection passageway 72 allows the second fluid supply 74 to communicate directly with the outlet passageway 32 through the valve body 22. In the preferred embodiment, as seen in FIG. 4, the pressure passageway 70 and injection passageway 72 share a common bore through the valve body and are commonly connected to the outlet passageway 32 through link passageway 76 in order to simplify manufacture and production of the valve body 22.

Referring FIGS. 3 and 4, in the preferred embodiment, the valve body 22 includes a relief passageway 78 communicating between the inlet passageway 30 and the outlet passageway 32. The relief passageway 78 includes a check valve or unidirectional valve 80 which allows fluid to flow from the outlet passageway 32 through the relief passageway 78 to the inlet passageway 30 and which prevents fluid flow from the inlet passageway 30 through the relief passageway 78 to the outlet passageway 32. The relief passageway 78 allows any pressure build-up in the outlet passageway 32 which exceeds the pressure in the inlet passageway 30 to be relieved into the inlet passageway 30. In other words, this allows any pressure build-up in the equipment or piping connected to the outlet passageway 32 which exceeds the pressure in the inlet passageway 30 and first fluid supply 34 to be relieved against the first fluid supply 34. In the preferred embodiment the relief passageway 78 is commonly connected to the link passageway 76 with the pressure passageway 70 and injection passageway 72. Preferably, the mechanism of the unidirectional check valve 80 is simply a ball or sphere, also designated 80. The relief passageway 78 is smaller at its first end 82 connection to the link passageway 76 than at its second end 84 connection with the inlet passageway 30 or bore 28. The sphere 80 is larger than the first end 82 of the relief passageway 78 but is smaller than the second end 84 of the relief passageway 78 and the sphere 80 is trapped in the relief passageway by the cage 24. Because of the size of the sphere 80, when the pressure at the inlet passageway 30 is larger than the pressure in the outlet passageway 32 the sphere 80 is forced against the first end 82 of the relief passageway 78, thus closing the relief passageway and preventing fluid flow through the relief passageway 78.

In operation, referring to FIGS. 1 and 3, the outlet passageway 32 of the pressure reducing valve 21 is connected to the intake connection 42 of a fluid user 36. The inlet passageway 30 of the pressure reducing valve 21 is connected to a first fluid supply 34, which supplies the fluid to be used by the fluid user 36. The actuator means 26 is connected to the connection between the fluid user intake connection 42 and the outlet passageway 32 with pressure sensing line 68 (as shown in phantom in FIG. 1). If the pressure reducing valve 21 is provided with a pressure passageway 70 the pressure sensing line 68 may be connected directly to the pressure passageway 70 and valve body 22. The pressure sensing line 68 should be made of piping, tubing, or similar conduit capable of withstanding the subatmospheric pressures generated by the fluid user 36 and the pressure present in the first fluid supply and other fluid supplies connected to the valve 21 without leaking.

As mentioned above, the fluid user 36 must be capable of generating a subatmospheric pressure at its intake connection 42 and on the equipment connected thereto. When the fluid user 36 is put into operation, it will pull a subatmospheric pressure or vacuum on the connection 40 between the fluid user 36 and the pressure reducing valve 21, since the pressure reducing valve 21 is normally closed to fluid flow by the biasing means 64. The subatmospheric pressure will be applied to the actuator means 26 through pressure sensing line 68 in opposition to the bias of biasing means 64 and will move plug 56 towards the open position, allowing fluid flow from the first fluid supply through pressure reducing valve 21 to the fluid user 36 as long as there is a subatmospheric pressure present in the pressure sensing line 68. Thus, if the first fluid supply is supplying too much fluid the pressure in the intake connection 42 and the pressure sensing line 68 will increase above subatmospheric pressure, thereby closing or partially closing the plug 56 until the fluid user 36 uses sufficient fluid to decrease the subatmospheric pressure. In one sense, the pressure reducing valve 21 is a vacuum regulator which will take fluid from the first fluid supply 34 at above atmospheric pressure and drop it to a vacuum or subatmospheric pressure at the outlet passageway of the valve 21.

Referring to FIG. 1, a second fluid supply 74 may be connected to the pressure reducing valve 21 to supply a second fluid to the fluid user 36. For example, the first fluid supply may be water and the second fluid supply may contain a chemical such as soap or wax to be used in a car wash. The second fluid supply 74 is connected to the fluid user connection 40 between the fluid user 36 and the valve 21, as shown in phantom in FIG. 6. In the preferred embodiment, the second fluid supply 74 is connected to the injection passageway 72 of the valve body 22. As the fluid user 36 creates a subatmospheric pressure at the outlet passageway 32 fluid is pulled from the second fluid supply 74 into the outlet passageway and into the fluid user 36. In the preferred embodiment an injection conduit 88 is connected between the second fluid supply 74 and the injection passageway 72. The injection conduit may be pipe, tubing, or similar conduit and should be leak free. Also, in the preferred embodiment, as seen in FIG. 1, a metering valve 90 is provided in the injection conduit 88. The metering valve 90 may be adjusted to regulate the flow of fluid from the second fluid supply 74 through the injection passageway 72 to the fluid user 36. A flow meter (not illustrated) may also be provided in the injection conduit 88 to precisely monitor the flow of fluid from the second fluid supply. Thus, it is seen that the pressure reducing valve 21 may be used to provide an accurate and inexpensive chemical injection system. Multiple fluid supplies may be connected to the inlet passageway 30 and multiple fluid supplies may be connected to the injection passageway 72 or fluid user connection 40 if desired, the only limitation being the ability of the fluid user 36 to create a subatmospheric pressure on the additional piping and equipment.

In the preferred embodiment, referring to FIGS. 3 and 4, the valve body 22 is comprised of a single piece of material, such as brass, metal alloy, or polymer. The bore 28 extends completely through the body 22 and the bore 28 has a generally linear axis 92. The inlet passageway 30 has a generally linear axis 94 perpendicular to the bore axis 92. The outlet passageway 32 has a generally linear axis 96 perpendicular to the bore axis 92 and coplanar with the bore axis and the inlet passageway axis 94. The pressure passageway 70 and injection passageway 72 use a common bore which extends completely through the valve body 22 on the outlet passageway 32 side of the bore 28. The link passageway 76 is connected between the pressure and injection passageways 70, 72 and the outlet passageway 32. The relief passageway 78 is connected between the bore 28 and the pressure and injection passageways 70, 72.

Referring to FIGS. 3 and 5, the cage 24 has a generally linear axis 98. The first end 44 of the cage 24 is open and the internal diameter of the first end 44 is threaded. The first end 44 is sufficiently smaller than the internal diameter of the bore 28 in order to allow fluid to flow from the inlet passageway around the first end of the cage to the relief passageway 78 and vice versa. The inlet chamber 48 of the cage 24 is located near the first end 44 of the cage and one side of the inlet chamber 48 is open to allow communication between the inlet passageway 30 and the inside of the cage 24. The orifice 52 is located just below the inlet chamber 48 of the cage 24. The outside diameter of the cage 24 surrounding the orifice 52 is larger than the outside diameter of the first end 44 of the cage 24 but still slightly smaller than the bore 28 to allow the cage to fit inside the bore 28. An upper O-ring type seal 100 fits into an upper O-ring slot 102 around the outside diameter of the cage just below the inlet chamber 48. The upper O-ring 100 seals the bore between the inlet passageway 30 and the outlet passageway 32 and prevents fluid flow around the outside of the cage 24, between the cage 24 and the bore 28, and between the inlet and outlet passageways 30, 32, thereby directing all fluid flow through the cage 24 and orifice 52. The outlet chamber 50 of the cage is below orifice 52 and O-ring 100. Referring to FIGS. 5 and 7, approximately one-half of the cage 24 is removed at the outlet chamber 50. The remaining wall of the cage 24 at the outlet chamber 50 creates the flow dividing vane 54. The preferred flow dividing vane 24 is arcuate in transverse cross-section, as best seen in FIG. 7. The flow dividing vane 54 is positioned on the circumference of the cage so that when the open side of the inlet chamber 48 is facing the inlet passageway 30 the flow dividing vane is positioned between the outlet passageway 32 and the inside of the cage 24. This forces any fluid flowing through the cage into the outlet chamber 50 to flow around the flow dividing vane 54 and stabilizes the fluid flow and eliminates fluid flow turbulence and pressure fluctuations in the outlet passageway 32. Without the flow dividing vane 54 the turbulence in the outlet passageway 32 is so great that the pressure passageway 70 and injection passageway 72 will not operate properly, i.e., the subatmospheric pressure of the intake connection of the fluid user 36 is not accurately transmitted into the outlet passageway 32 and therefore cannot be accurately transmitted through the pressure passageway 70 and pressure sensing line 86 to properly operate the actuator means 26 and valve 21. Similarly, without the flow dividing vane 54 the subatmospheric pressure generated at the intake connection 42 of the fluid user 36 is not accurately transmitted to the outlet connection 32 and through the injection passageway 72 to reliably draw fluid from the second fluid supply 74. A lower O-ring 104 is positioned in a lower O-ring slot 106 below the outlet chamber 50. The lower O-ring 104 seals the bore below the outlet passageway 32 and prevents the flow of fluid around the cage through the bore to the outside of the valve body 22. The second end 46 of the cage 24 is larger in diameter than the bore 28. The second end 46 of the cage is also closed to seal the second end of the cage 24 from fluid flow. The first end of the cage is inserted into the bore and the second end of the cage forms a stop which properly positions the cage 24 in the bore 28 and also forms part of the actuator means 26 fastening system, as further explained below.

Referring to FIG. 3, in the preferred embodiment the actuator means 26 is a diaphragm-type actuator, also designated 26. Equivalent actuator means 26, such as piston-type actuators may also be used. The actuator means 26 includes a diaphragm 108 mechanically fastened between an upper casing 110 and a lower casing 112. The diaphragm 108 receives the second end 62 of the valve stem 58. In the preferred embodiment the diaphragm has a fastener 114 which is internally threaded. The second end 62 of the valve stem 58 is also threaded and threadingly engages the fastener 114. Thus the valve stem 58 and plug 56 are carried by the diaphragm 108. The valve stem 58 extends from the lower side of the diaphragm 108 and fastener 114 through an opening in the lower casing 112. The opening is surrounded by a threaded ferrule 116 and the valve stem 58 extends through the ferrule 116. The threading of the ferrule 116 mates with the threading in the first end 44 of the cage 24 and thus the actuator means 26 may be threaded into the cage. The threading of the actuator means 26 into the cage 24 also serves to tighten the cage 24 into the valve body 22, as the second end 46 of the cage contacts the valve body 22 thus uniting the actuator means 26, valve body 22, and cage 24. O-rings 115 are positioned around the valve stem 58 to seal the engagement between the ferrule 116 and the valve stem 58 in all positions of the plug 56. An O-ring 117 is positioned around the ferrule 116 between the threading and the lower casing 112 of the actuator means 26. The O-rings 115, 117 seal the connection of the actuator means 26 to the valve body 22, bore 28, and cage 24, preventing fluid flow from the inlet passageway 30 to the outside of the valve 21, or into the actuator 26.

In the preferred embodiment, best seen in FIG. 3, the biasing means 64 is positioned between the upper side of the diaphragm 108 and the upper casing 110 and biases the diaphragm 108 towards the lower casing 112, thus forcing the plug 56 downward and into engagement with orifice 52 when the actuator means 26 is assembled to the valve body 22 and cage 24. In the preferred embodiment, the biasing means is a compression spring. There are equivalent ways of providing the biasing means 64, such as making the diaphragm 108 of spring steel or material which is formed to bias the diaphram 108 towards the lower casing 112. The use of a compression spring is preferred because a compression spring is easily replaced and is relatively inexpensive. The magnitude of the subatmospheric pressure (or the pressure drop across the valve 21) may be selectively regulated by varying the strength of the compression spring or biasing means 64. Since the amount of subatmospheric pressure required to overcome the strength of the biasing means and lift the plug 56 is determined by the strength of the biasing means 64, the strength of the compression spring 64 or bias of the biasing means 64 will determine the magnitude of subatmospheric pressure in the connection 40 and intake connection 42.

A nippled extension 118 extends from the upper casing 110 of the diaphragm. The nippled extension 118 is open the center allowing fluid communication with the upper side of the diaphragm 108 through the nippled extension. The nippled extension 118 is used to connect the actuator means 26 to the pressure passageway 70 or to the fluid user connection 40 with pressure sensing line 68 and thus the pressure present in the outlet passageway 32 is transmitted through the pressure sensing line 68 to the actuator means 26 and the upper side of the diaphragm 108. When the fluid user 36 creates a subatmospheric pressure at its intake connection 42 and at the outlet passageway 32, this subatmospheric pressure is transmitted through pressure sensing line 68 to the upper side of the diaphragm 108 and moves the diaphragm towards the upper casing 110 lifting the plug 56 from the orifice 52 and allowing fluid flow from the first fluid supply through the valve 20 to the fluid user 36.

In one preferred embodiment of the pressure reducing valve 21, referring to FIG. 3, the plug 56 is provided with a shunt passageway 120 which extends through the plug and allows fluid communication between the inlet passageway 30 and the outlet passageway 32 in the closed position of the plug 56. The shunt passageway 120 keeps the outlet passageway 32 and connection 42 full of fluid from the first fluid supply 34 and allows a selected minimum flow of fluid to the fluid user 36 from the first supply 34. Some types of fluid users 46 require that their intake connection 42 be fluid full before they can pull a subatmospheric pressure at their intake connection 42, and similarly some types of fluid users 36 require a minimum fluid flow to maintain a subatmospheric pressure at their intake connection 42. The shunt passageway 120 allows these types of fluid users 46 to be used with the fluid supply apparatus 20. The size or diameter of the shunt passageway 120 may be selected to provide the fluid flow required by a particular fluid user 46 and will be dependent upon the pressure drop expected across the plug 56 in a particular application. A solid plug 56, that is, a plug 56 not having a shunt passageway 120, may be used if the fluid user 36 does not require a minimum fluid flow or the presence of fluid at the intake connection 42 in order to generate a subatmospheric pressure at the intake connection 42.

In the preferred embodiment the end of the plug 56 cooperating with or contacting the orifice 52 is generally conically shaped. The smaller end of the cone is nearest the orifice 52 and has a smaller diameter than the diameter of the orifice, so that the smaller end of the cone will be received inside the orifice with the shoulders of the cone sealing against the sides of the orifice in the closed position of the plug 56, best seen in FIG. 2. The conical shape of the plug 56 stabilizes the operation of the valve 21 and eliminates chattering or bouncing of the plug 56 on the orifice 52 when the plug 56 begins to open. This conical shape was found after much experimentation and is the best operational shape for the plug 56 known to the inventor. In the preferred embodiment the shoulders of the cone form a 30° angle with the longitudinal axis of the plug 56 and valve stem 58.

While the invention has been described with a certain degree of particularly it is manifest that many changes may be made in the details of construction and the arrangement of components without departing from the spirit and scope of this disclosure. It is to be understood the invention is not limited to the embodiments set forth herein for purposes of exemplification, but is to be limited only by the scope of the attached claim or claims including the full range of equivalency to which each element thereof is entitled.

What is claimed is:

1. A fluid supply apparatus comprising:
   a pressure reducing valve, the valve including:
   a valve body, the valve body including:
   a bore extending into the valve body;
   an inlet passageway, connectable to a first fluid supply, the inlet passageway extending into the valve body and being in fluid communication with the bore;
   an outlet passageway, connectable to a suction-demand-type fluid user, the outlet passageway extending into the valve body and being in fluid communication with the bore;
   an orifice, located in the bore between the inlet passageway and the outlet passageway, the orifice being of smaller aperture than the bore, the orifice allowing fluid communication between the inlet passageway and the outlet passageway; and
   a flow dividing vane extending across and partially blocking the bore between the orifice and the outlet passageway, the vane blocking direct flow of fluid from the bore into the outlet passageway and dividing the flow of fluid from the bore into the outlet passageway, thereby minimizing fluid flow turbulence and pressure fluctuations in the outlet passageway;
   a plug, positionable in the bore, the plug cooperating with the orifice and being movable relative to the orifice between a closed position in which fluid communication through the orifice is minimized and an open position in which fluid communication through the orifice is maximized;
   a valve stem having a first end connected to the plug and a second end;
   biasing means for biasing the plug into the closed position; and
   an actuator means, sealingly connectable to the valve body, the bore, and the second end of the valve stem, for moving the plug between the open position and the closed position, the actuator means being fluid pressure communicatingly connectable to the connection between the outlet passageway and the fluid user, the actuator means moving the plug towards the open position when a subatmospheric pressure is communicated to the actuator means in opposition to the bias of the biasing means.

2. The apparatus of claim 1:
wherein the valve body is further defined as including an injection passageway, connectable to a second fluid supply, the injection passageway extending into the valve body and being in fluid communication with the outlet passageway.

3. The apparatus of claim 1:
wherein the valve body is further defined as including a pressure passageway extending into the valve body and being in fluid communication with the outlet passageway; and
wherein the actuator means is fluid pressure communicatingly connectable to the pressure passageway.

4. The apparatus of claim 1:
wherein the valve body is further defined as including a relief passageway communicating between the inlet passageway and the outlet passageway, the relief passageway including a unidirectional valve, the unidirectional valve allowing fluid to flow from the outlet passageway through the relief passageway to the inlet passageway and preventing fluid flow from the inlet passageway through the relief passageway to the outlet passageway.

5. The apparatus of claim 1:

wherein the plug is generally conically shaped, the smaller end of the cone being nearest the orifice, the smaller end of the cone having a smaller diameter than the orifice diameter.

6. The apparatus of claim 1:
wherein the plug includes a shunt passageway extending through the plug and allowing fluid communication between the inlet passageway and the outlet passageway in the closed position of the plug.

7. The apparatus of claim 1: wherein the biasing means is an adjustable biasing means, the amount of bias provided being selectively adjustable.

8. The apparatus of claim 1, in which the pressure reducing valve further comprises:
a generally cylindrical hollow valve cage, sealingly positionable in the bore, the cage having an open first end and a closed second end, the cage including:
  an inlet chamber communicable with the inlet passageway; and
  an outlet chamber communicable with the outlet passageway; and
wherein the orifice is further defined as being an integral part of the cage, the orifice being located in the cage between the inlet chamber and the outlet chamber, the orifice being of smaller diameter than the cage, the orifice allowing fluid communication between the inlet chamber and the outlet chamber; and
wherein the flow dividing vane is further defined as being an integral part of the cage, the vane extending across one side of the outlet chamber and blocking direct fluid flow between the outlet chamber and the outlet passageway, the vane dividing the flow of fluid from the outlet chamber into the outlet passageway; and
wherein the plug is further defined as being positionable in the cage; and
wherein the second end of the valve stem is further defined as being extendable through the open end of the cage; and
wherein the actuator means is further defined as being sealingly connectable to the valve body, the bore, the open end of the cage, and the second end of the valve stem.

9. The apparatus of claim 1, further comprising:
a suction-demand-type fluid user having an intake connection, the fluid user creating a subatmospheric pressure at the intake connection when using fluid; and
wherein the valve body outlet passageway is fluid-communicatingly connected to the intake connection.

10. The apparatus of claim 9:
wherein the fluid user is a pump.

11. The apparatus of claim 9:
wherein the fluid user is a compressor.

12. The apparatus of claim 9 further comprising:
a second fluid supply fluid-communicatingly connected to the connection between the fluid user intake connection and the valve body outlet passageway; and
metering means, located in the connection between the second fluid supply and the fluid user, for selectively controlling the flow of second fluid from the second fluid supply through the metering means into the fluid user intake connection;
whereby the creation of subatmospheric pressure at the intake connection of the fluid user will pull a selected flow of the second fluid into the intake connection.

13. The apparatus of claim 12:
wherein the valve body is further defined as including an injection passageway, connectable to the second fluid supply, the injection passageway extending into the valve body and being in fluid communication with the outlet passageway; and
wherein the second fluid supply is fluid-communicatingly connected to the injection passageway.

14. A fluid supply apparatus, comprising:
a pressure reducing valve, the valve including:
  a valve body, the valve body including:
    a bore extending into the valve body;
    an inlet passageway, connectable to a first fluid supply, the inlet passageway extending into the valve body and being in fluid communication with the bore; and
    an outlet passageway, connectable to a suction-demand-type fluid user, the outlet passageway extending into the valve body and being in fluid communication with the bore;
  a generally cylindrical hollow valve cage, sealingly positionable in the bore, the cage having an open first end and a closed second end, the cage including:
    an inlet chamber communicable with the inlet passageway;
    an outlet chamber communicable with the outlet passageway;
    an orifice, located in the cage between the inlet chamber and the outlet chamber, the orifice being of smaller aperture than the cage, the orifice allowing fluid communication between the inlet chamber and the outlet chamber; and
    a flow dividing vane, extending across and partially blocking the fluid communication between the outlet chamber and the outlet passageway, the vane blocking direct flow of fluid from the outlet chamber into the outlet passageway and dividing the flow of fluid from the outlet chamber into the outlet passageway, thereby minimizing flow turbulence and pressure fluctuations in the outlet passageway;
  a plug, positionable in the cage, the plug cooperating with the orifice and being movable relative to the orifice between a closed position in which fluid communication through the orifice is minimized and an open position in which fluid communication through the orifice is maximized;
  a valve stem having a first end connected to the plug and a second end; the second end being extendable through the open end of the cage;
  biasing means for biasing the plug into the closed position; and
  an actuator means, sealingly connectable to the valve body, the bore, the open end of the cage, and the second end of the valve stem, for moving the plug between the open position and the closed position, the actuator means being fluid pressure communicatingly connectable to the connection between the outlet passageway and the fluid user, the actuator means moving the plug towards the open position when a subatmospheric fluid pressure is communicated to the actuator means in opposition to the bias of the biasing means.

15. A fluid supply apparatus, comprising:
a pressure reducing valve, the valve including:
   a valve body, the valve body including:
      a bore extending into the valve body;
      an inlet passageway, connectable to a first fluid supply, the inlet passageway extending into the valve body and being in fluid communication with the bore;
      an outlet passageway, connectable to a suction-demand-type fluid user, the outlet passageway extending into the valve body and being in fluid communication with the bore;
      an orifice, located in the bore between the inlet passageway and the outlet passageway, the orifice being of smaller aperture than the bore, the orifice allowing fluid communication between the inlet passageway and the outlet passageway;
      a flow dividing vane extending across and partially blocking the bore between the orifice and the outlet passageway, the vane blocking direct flow of fluid from the bore into the outlet passageway and dividing the flow of fluid from the bore into the outlet passageway, thereby minimizing fluid flow turbulence and pressure fluctuations in the outlet passageway;
      an injection passageway, connectable to a second fluid supply, the injection passageway extending into the valve body and being in fluid communication with the outlet passageway; and
      a pressure passageway, extending into the valve body and being in fluid communication with the outlet passageway;
   a plug, positionable in the bore, the plug cooperating with the orifice and being movable relative to the orifice between a closed position in which fluid communication through the orifice is minimized and an open position in which fluid communication through the orifice is maximized;
   a valve stem having a first end connected to the plug and a second end;
   biasing means for biasing the plug into the closed position; and
   an actuator means, sealingly connectable to the valve body, the bore, and the second end of the valve stem and fluid pressure communicatingly connectable to the connection between the outlet passageway and the fluid user, for moving the plug between the open position and the closed position and for moving the plug towards the open position when a subatmospheric pressure is communicated to the actuator means in opposition to the bias of the biasing means.

16. The apparatus of claim 15;
wherein the valve body is further defined as including a relief passageway communicating between the inlet passageway and the outlet passageway, the relief passageway including a unidirectional valve, the unidirectional valve allowing fluid to flow from the outlet passageway through the relief passageway to the inlet passageway and preventing fluid flow from the inlet passageway through the relief passageway to the outlet passageway.

17. A fluid supply apparatus, comprising:
a suction-demand-type fluid user having an intake connection, the fluid user creating a subatmospheric pressure at the intake connection when using fluid; and
a pressure reducing valve, the valve including:
   a valve body, the valve body including:
      a bore extending into the valve body;
      an inlet passageway, connectable to a first fluid supply, the inlet passageway extending into the valve body and being in fluid communication with the bore;
      an outlet passageway, connectable to the intake connection of the fluid user, the outlet passageway extending into the valve body and being in fluid communication with the bore;
      an orifice, located in the bore between the inlet passageway and the outlet passageway, the orifice being of smaller aperture than the bore, the orifice allowing fluid communication between the inlet passageway and the outlet passageway; and
      a flow dividing vane extending across and partially blocking the bore between the orifice and the outlet passageway, the vane blocking direct flow of fluid from the bore into the outlet passageway and dividing the flow of fluid from the bore into the outlet passageway, thereby minimizing fluid flow turbulence and pressure fluctuations in the outlet passageway;
   a plug, positionable in the bore, the plug cooperating with the orifice and being movable relative to the orifice between a closed position in which fluid communication through the orifice is minimized and an open position in which fluid communication through the orifice is maximized;
   a valve stem having a first end connected to the plug and a second end;
   biasing means for biasing the plug into the closed position; and
   an actuator means, sealingly connectable to the valve body, the bore, and the second end of the valve stem and fluid pressure communicatingly connectable to the connection between the outlet passageway and the fluid user, for moving the plug between the open position and the closed position and for moving the plug towards the open position when a subatmospheric pressure is communicated to the actuator in opposition to the bias of the biasing means.

18. A fluid supply apparatus, comprising:
a suction-demand-type fluid user having an intake connection and a discharge connection, the fluid user creating a subatmospheric pressure at the intake connection when using fluid;
a first fluid supply;
a second fluid supply;
metering means, connected to the second fluid supply, for selectively controlling the flow of second fluid from the second fluid supply; and
a pressure reducing valve, the valve including:
   a valve body, the valve body including:
      a bore extending into the valve body;
      an inlet passageway, connectable to the first fluid supply, the inlet passageway extending into the valve body and being in fluid communication with the bore;
      an outlet passageway, connectable to the fluid user intake connection, the outlet passageway extending into the valve body and being in fluid communication with the bore;

an orifice, located in the bore between the inlet passageway and the outlet passageway, the orifice being of smaller aperture than the bore, the orifice allowing fluid communication between the inlet passageway and the outlet passageway;

a flow dividing vane extending across and partially blocking the bore between the orifice and the outlet passageway, the vane blocking direct flow of fluid from the bore into the outlet passageway and dividing the flow of fluid from the bore into the outlet passageway, thereby minimizing fluid flow turbulence and pressure fluctuations in the outlet passageway;

an injection passageway, connectable to the metering means of the second fluid supply, the injection passageway extending into the valve body and being in fluid communication with the outlet passageway; and a pressure passageway, extending into the valve body and being in fluid communication with the outlet passageway;

a plug, positionable in the bore, the plug cooperating with the orifice and being movable relative to the orifice between a closed position in which fluid communication through the orifice is minimized and an open position in which fluid communication through the orifice is maximized;

a valve stem having a first end connected to the plug and a second end;

biasing means for biasing the plug into the closed position; and an actuator means, sealingly connectable to the valve body, the bore, and the second end of the valve stem and fluid pressure communicatingly connectable to the pressure passageway, for moving the plug between the open position and the closed position and for moving the plug towards the open position when a subatmospheric pressure is communicated to the actuator means in opposition to the bias of the biasing means;

whereby the creation of a subatmospheric pressure at the intake connection of the fluid user will be communicated to the outlet passageway of the pressure reducing valve, the subatmospheric pressure being communicated through the pressure passageway to the actuator means and moving the plug to the open position allowing fluid communication and fluid flow through the orifice from the first fluid supply to the fluid user, the pressure of the first fluid being reduced from a non-subatmospheric pressure in the first fluid supply to the subatmospheric pressure of the fluid user intake connection, the subatmospheric pressure being communicated through the injection passageway and metering means to the second fluid supply thereby pulling a selected flow of the second fluid into the outlet passageway and fluid user intake connection.

19. The apparatus of claim 18:

wherein the valve body is further defined as including a relief passageway communicating between the inlet passageway and the outlet passageway, the relief passageway including a unidirectional valve, the unidirectional valve allowing fluid to flow from the outlet passageway through the relief passageway to the inlet passageway and preventing fluid flow from the inlet passageway through the relief passageway to the outlet passageway.

* * * * *